S. R. HUNTER.
Mowing Machine.
No. 15,377.
Patented July 22, 1856.
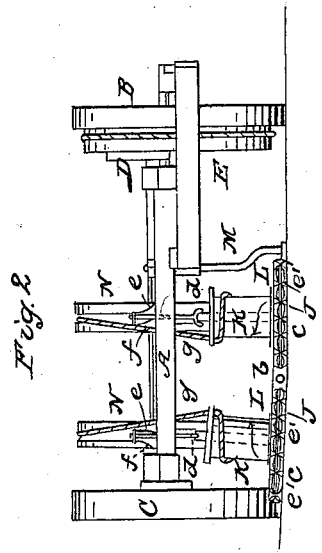
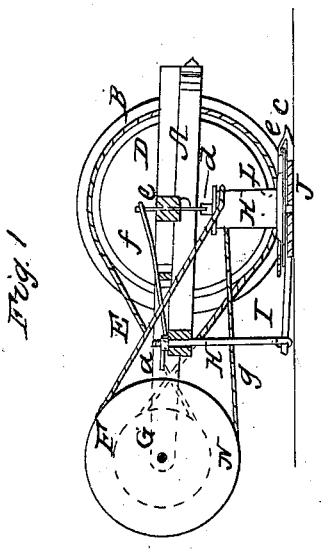
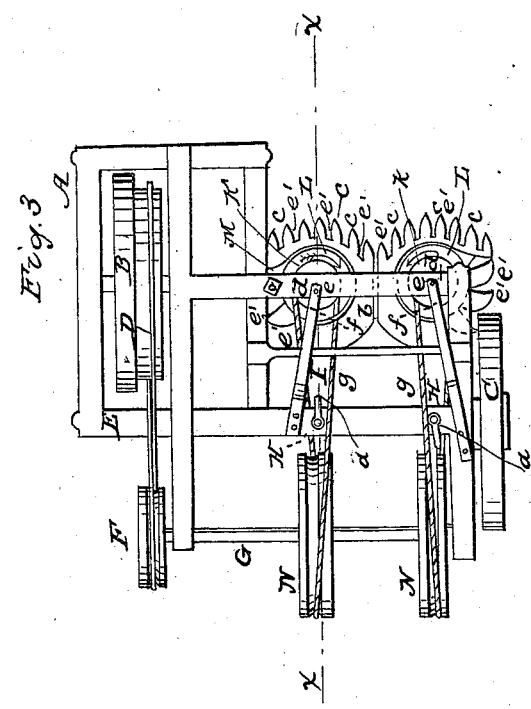

UNITED STATES PATENT OFFICE.

STEPHEN R. HUNTER, OF CORTLAND, NEW YORK.

IMPROVEMENT IN HARVESTERS.

Specification forming part of Letters Patent No. 15,377, dated July 22, 1856.

*To all whom it may concern:*

Be it known that I, STEPHEN R. HUNTER, of Cortland, in the county of Cortland and State of New York, have invented a new and Improved Grain and Grass Harvester; and I do hereby declare that the following is a full, clear, and exact description of the same, reference being had to the annexed drawings, making a part of this specification, in which—

Figure 1 is a longitudinal vertical section of my improvement, $x\ x$, Fig. 3, showing the plane of section. Fig. 2 is a front view of the same. Fig. 3 is a plan or top view of the same.

Similar letters of reference indicate corresponding parts in the several figures.

My invention consists in the employment or use of rotary cutters, which are fitted within slotted fingers attached to curved plates, which are hinged together or connected by a joint, and attached to the axle in such a manner that the cutters may be made to conform to the inequalities of the ground, as will be hereinafter fully shown and described.

To enable those skilled in the art to fully understand and construct my invention, I will proceed to describe it.

A represents the main frame of the machine, which frame is supported by two wheels, B C, B being the driving-wheel, and having a pulley, D, attached to its inner side, around which pulley a cross-belt, E, passes, said belt also passing around a pulley, F, which is placed on a shaft, G, at the back part of the frame A. (See Figs. 1 and 3.)

H H are two vertical rods, the upper ends of which pass through the back part of the frame A, and have nuts $a\ a$ upon them. The lower ends of the rods H H have eyes or holes made through them, in which holes tenons on the inner ends of the horizontal bars I I pass. The outer ends of the bars I I have semicircular plates J J attached, which plates are placed side by side and connected by a hinge or joint, $b$, as shown in Figs. 2 and 3. The edges of the plates J J have slotted fingers $c$ attached to them. The plates J J have vertical shafts $d\ d$ attached to them, the upper ends of which are connected by rods $e\ e$ to springs $f\ f$, which are attached to the frame A.

On each shaft $d\ d$ there is placed a cylinder, K. The lower ends of these cylinders have circular plates L attached to them, said plates having teeth $e'$ on their peripheries, which teeth work through the slotted fingers $c$.

A vertical guide-rod, M, is attached to the frame A, and one of the plates J works thereon, as shown clearly in Fig. 2.

N N are two pulleys, which are placed on the shaft G, said pulleys having belts $g$ passing around them, which belts also pass around the cylinders K K.

As the machine is drawn along the cutters are rotated in opposite directions, the front portions toward each other, as indicated by the arrows in Fig. 3, and the grain or grass is cut by the cutters or teeth $e'$ as they enter or pass through the slotted fingers $c$. The fingers are supported principally by the springs $f\ f$; but they still bear slightly upon the surface of the ground, and as the two plates J J are connected by the hinge $b$ the cutters are allowed to conform perfectly to the inequalities of the surface of the ground.

The above machine may be economically constructed, may be made quite light and of easy draft, and there are no parts liable to get out of repair.

I do not claim the rotary cutters working within or through the slotted fingers separately or in themselves considered, for they have been previously used; but,

Having thus described my invention, what I claim as new, and desire to secure by Letters Patent, is—

The employment or use of the rotating cutters, formed of circular plates L, with teeth $e'$ at their peripheries, said teeth working through or between slotted fingers $c$ on the plates J J, when said plates are connected by a hinge or joint, $b$, and attached to the frame A, as shown and described, for the purpose set forth.

STEPHEN R. HUNTER.

Witnesses:
P. BACON DAVIS,
R. H. DUELL.